United States Patent [19]

Mollet et al.

[11] Patent Number: 5,116,534
[45] Date of Patent: May 26, 1992

[54] AQUEOUS EMULSIONS CONTAINING ANTIOXIDANTS

[75] Inventors: Hans Mollet, Reinach; Martin Holer, Magden, both of Switzerland

[73] Assignee: Ciba-Ceigy Corporation, Ardsley, N.Y.

[21] Appl. No.: 645,377

[22] Filed: Jan. 18, 1991

[30] Foreign Application Priority Data

Jan. 24, 1990 [CH] Switzerland ............... 229/90

[51] Int. Cl.$^5$ .............................. B01J 13/00
[52] U.S. Cl. ................... 252/308; 252/356; 252/358; 252/399; 252/400.2
[58] Field of Search ......... 252/308, 358, 356, 400.2, 252/399

[56] References Cited

U.S. PATENT DOCUMENTS

| | | | |
|---|---|---|---|
| 3,644,482 | 2/1972 | Dexter et al. | 260/473 |
| 3,928,267 | 12/1975 | Rhodes et al. | 524/128 |
| 3,944,594 | 3/1976 | Kleiner et al. | 260/473 |
| 3,962,123 | 6/1976 | DiBattista et al. | 252/400 |
| 4,132,702 | 1/1979 | Schmidt et al. | 260/45.8 |
| 4,439,570 | 3/1984 | Messin et al. | 524/154 |
| 4,824,601 | 4/1989 | Franklin | 252/401 |

FOREIGN PATENT DOCUMENTS 330256 8/1989 European Pat. Off. .
333643 9/1989 European Pat. Off. .
1349669 4/1974 United Kingdom .

OTHER PUBLICATIONS

Derwent Abstract 90:364,547.
Chem. Abstract 14:120032q (1989).

*Primary Examiner*—Robert L. Stoll
*Assistant Examiner*—Nina Bhat
*Attorney, Agent, or Firm*—JoAnn Villamizar

[57] ABSTRACT

Storage-stable, non-sedimenting emulsions containing a) 10 to 40% by weight, based on the emulsion, of (A) phenolic antioxidants and antioxidants from the series comprising (B) thiodipropionic acid esters or/and (C) organic phosphites, b) 0.25 to 10% by weight, based on the emulsion, of a surfactant of the formula R-COOY, in which R is alkyl having 3 to 18 atoms, alkenyl having 3 to 18 C atoms or phenyl-$C_3$-$C_{18}$alkyl and Y is an alkali metal, 0.25 to 10% by weight, based on the emulsion, of an alcohol of the formula R'-OH, in which R' is alkyl having 4 to 19 C atoms, alkenyl having 4 to 19 C atoms or phenyl-$C_4 C_{19}$alkyl, and water as the remainder to make 100% by weight.

The emulsions are employed in particular for stabilizing emulsion-polymerized polymers and copolymers, for example ABS.

20 Claims, No Drawings

AQUEOUS EMULSIONS CONTAINING ANTIOXIDANTS

The invention relates to storage-stable, non-sedimenting emulsions containing antioxidants, for example for use for stabilizing emulsion-polymerized polymers and copolymers against oxidative influences. The preparation of storage-stable dispersions containing phenolic antioxidants is known from U.S. Pat. No. 3,962,123. In addition to phenolic antioxidants which are solid per se, such dispersions contain fatty acid soaps or nonionic or anionic surface-active agents and water. Such dispersions are prepared by mixing the various constituents. Mixing must be carried out in a disadvantageous manner using a high-speed stirrer. This means that a high expenditure on apparatus with a high energy consumption is necessary for preparation of the dispersions.

Novel storage-stable emulsions containing antioxidants which can also be prepared in a simple manner to the skilled expert with protective treatment of the energy sources available have now been found.

According to the invention, the emulsions contain a) 10 to 40% by weight, based on the emulsion, of antioxidants, at least one phenolic antioxidant from the series comprising the compounds (A) of the formula I $$\left[ \begin{array}{c} R_1 \quad R_3 \\ R_4 \underset{R_2 \quad R_5}{\bigcirc} A \end{array} \right]_n \quad (I)$$

in which $R_1$ is alkyl having 1 to 18 C atoms, cycloalkyl having 5 to 12 C atoms, $C_1$-$C_4$alkyl-substituted cycloalkyl having 5 to 12 ring C atoms, phenyl or aralkyl having 7 to 9 C atoms, or, if $R_4$ is H or $C_1$-$C_4$alkyl and $R_5$ is —OH, $R_1$ can additionally be hydrogen, $R_2$ is —H, alkyl having 1 to 18 C atoms, cycloalkyl having 5 to 12 C atoms, $C_1$-$C_4$alkyl-substituted cycloalkyl having 5 to 12 ring C atoms, phenyl or aralkyl having 7 to 9 C atoms, $R_3$ is —H or $CH_3$ and n is 1 or 2, and, (i) if n is 1,
A is $$-(C_xH_{2x})-\overset{O}{\underset{\|}{C}}-OR_6,$$

x is 0 to 6, $R_6$ is —H, alkyl having 1 to 23 C atoms, cycloalkyl having 5 to 12 C atoms or $C_1$-$C_4$alkyl-substituted cycloalkyl having 5 to 12 ring C atoms, $R_4$ is —OH and $R_5$ is —H, or (ii) if n is 2,
A is $$-(C_xH_{2x})-\overset{O}{\underset{\|}{C}}-X-[(C_aH_{2a})X]_b\overset{O}{\underset{\|}{C}}-(C_xH_{2x})-$$

x is 0 to 6,

X is oxygen or sulfur,
a is 2 to 6,
b is 3 to 40,
$R_4$ is —OH and $R_5$ is —H, or
(iii) if n is 2,
A is —S—, —O—, —CH$_2$—S—CH$_2$—, $$-CH_2-\underset{\underset{R_7}{|}}{N}-CH_2-$$

or an alkylene radical having 1 to 20 C atoms, and $R_4$ is —OH and $R_5$ is —H, or $R_5$ is —OH and $R_4$ is —H or $C_1$-$C_4$alkyl, and $R_1$ is additionally —H, and $R_7$ is alkyl having 1 to 18 C atoms, unsubstituted, hydroxy-substituted or $C_1$-$C_{18}$alkyl-substituted phenyl or a phenyl-or hydroxyphenyl-substituted $C_1$-$C_{18}$alkyl; and at least one antioxidant from the series comprising compounds (B) of the formula II and/or of the compounds (C) of the formula III $$\left( S-\left[CH_2-CH_2-C\overset{\displaystyle O}{\underset{\displaystyle OR_a}{\diagup}}\right] \right)_2 \quad (II)$$

$$\begin{array}{c} X_1O \\ X_2O \rightarrow P, \\ X_3O \end{array} \quad (III)$$

in which $R_a$ is alkyl having 8 to 18 C atoms and $X_1$, $X_2$ and $X_3$ are identical or different and are $C_6$-$C_{18}$alkyl, $C_6$-$C_{18}$alkenyl, $C_5$-$C_7$cycloalkyl, phenyl or with $C_1$-$C_{18}$alkyl substituted phenyl, b) 0.25 to 10% by weight, based on the emulsion, of a surfactant of the formula R—COOY, in which R is alkyl having 3 to 18 C atoms, alkenyl having 3 to 18 C atoms or phenyl-$C_3$-$C_{18}$alkyl and Y is an alkali metal, c) 0.25 to 10% by weight, based on the emulsion, of an alcohol of the formula R'—OH, in which R' is alkyl having 4 to 19 C atoms, alkenyl having 4 to 19 C atoms or phenyl-$C_4$-$C_{19}$alkyl, and d) water as the remainder to make up to 100% by weight.

The present invention also relates to a process for the preparation of a storage-stable, non-sedimenting emulsion containing antioxidants (A), (B) and/or (C) as well as water, which comprises heating and mixing the antioxidants with a surfactant of the formula R—COOY, an alcohol of the formula R'—OH and water and if appropriate adding further water to establish the desired concentration, the general symbols being defined as above. This process is preferably carried out by heating and mixing the antioxidants with an acid of the formula R—COOH and an alcohol of the formula R'—OH and then adding an aqueous solution of at least one alkali metal hydroxide, one alkali metal bicarbonate or one alkali metal carbonate to the mixture, 1-20% by weight of the water required for the preparation of the emulsion being used as the solvent for the alkali metal compound mentioned and the alkali metal compound being employed in approximately equivalent amounts, based on the acid, and then adding the remainder of the water to establish the concentration of the emulsion. In this procedure, the antioxidants are preferably added in liquid form or in the liquefied form obtained by heating.

The antioxidants used can be liquid or solid per se. The present invention particularly relates to antioxidants which are in solid form at room temperature.

Compounds which are advantageous antioxidants (A) are those of the general formula Ia

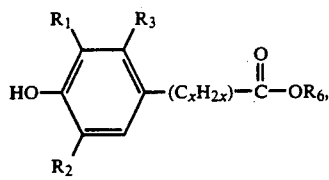

in which $R_1$, $R_2$, $R_3$ and $R_6$ are as defined above and x is the number 2 or 3.

Particularly advantageous compounds which are mentioned are those of the formula Ia in which the group

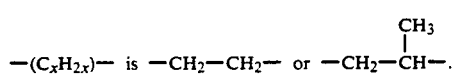

Compounds which are furthermore preferred are those of the formula Ia in which $R_1$ is methyl or tert.butyl, $R_2$ is tert.butyl and $R_3$ is hydrogen. Preferred compounds are also those of the formula Ia in which $R_6$ is $C_4$–$C_{18}$alkyl, and particularly preferably $C_{12}$–$C_{18}$alkyl, a $C_{12}$- or a $C_{18}$alkyl radical $R_6$ being especially preferred.

The especially preferred compound of the formula Ia is

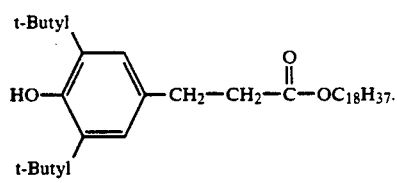

The compounds of the formula Ia are known per se from U.S. Pat. No. 3,644,482 and can be prepared, for example, in the manner described in that specification.

Advantageous compounds are also those of the formula Ib

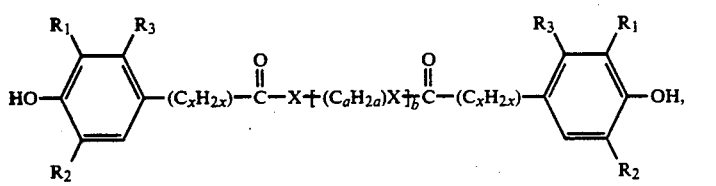

in which X, $R_1$, $R_2$ and $R_3$ have the abovementioned meaning, x is 2 or 3,
a is 2 to 4 and
b is 3 to 28.

Preferred compounds are those of the formula Ib in which $R_1$ is methyl or tert.butyl, $R_2$ is tert.butyl and $R_3$ is H—. Preferred compounds are also those of the formula Ib in which X is oxygen. Preferred compounds are also those of the formula Ib in which the group

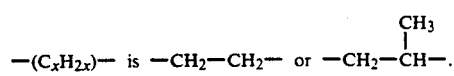

Compounds which are furthermore preferred are those of the formula Ib in which a is 2. Other preferred meanings relate to compounds of the formula Ib in which b is 3.

The especially preferred compound of the formula Ib is

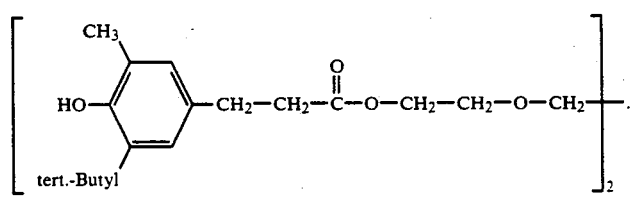

The compounds of the formula Ib are known per se from German Offenlegungsschrift 2,133,374 and can be prepared, for example, in the manner described in that specification.

Another group of advantageous compounds of the formula I is shown by the formula Ic

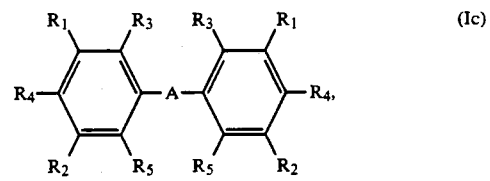

in which $R_1$, $R_2$, $R_3$, $R_4$ and $R_5$ are as defined above and A is —S—, —CH$_2$—S—CH$_2$—, —CH$_2$—,

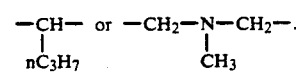

Preferably, in the compounds of the formula Ic, $R_1$ and $R_2$ independently of one another are —H or $C_1$-$C_4$alkyl, and particularly preferably methyl or tert.butyl.

Particularly preferred compounds are those of the formula Ic in which $R_1$ is tert.butyl, $R_2$ is —H, $R_3$ is —H, $R_4$ is —OH and $R_5$ is methyl, or in which $R_1$ is tert.butyl, $R_2$ is methyl, $R_3$ is —H, $R_4$ is —OH and $R_5$ is —H. In other particularly preferred meanings in compounds of the formula Ic, $R_1$ and $R_2$ are tert.butyl, $R_3$ and $R_5$ are —H and $R_4$ is —OH.

Furthermore, particularly preferably, $R_1$ is methyl, $R_2$ is tert.butyl, $R_3$ and $R_4$ are —H and $R_5$ is —OH in compounds of the formula Ic.

The especially preferred compound of the formula Ic is

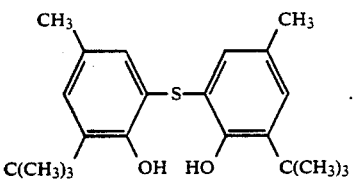

The compounds of the formula Ic are known per se, for example from British Patent Specification 1,349,669.

Alkyl $R_1$, $R_2$ and $R_7$ or an alkyl group $R_1$, $R_2$ and $R_7$ having 1 to 18 C atoms in the above statements is, for example, methyl, ethyl, propyl, isopropyl, n-butyl, isobutyl, 2-butyl, t-butyl, pentyl, isopentyl, hexyl, heptyl, 3-heptyl, octyl, 2-ethylhexyl, nonyl, decyl, undecyl, dodecyl, tridecyl, tetradecyl, pentadecyl, hexadecyl, heptadecyl or octadecyl; 2-ethylbutyl; 1-methylpentyl; 1,3-dimethylbutyl; 1,1,3,3-tetramethylbutyl; 1-methylhexyl; isoheptyl; 1-methylheptyl; 1,1,3-trimethylhexyl or 1-methylundecyl. $R_1$ and $R_2$ in particular are $C_1$-$C_4$alkyl, at least one of the two radicals preferably being tert.butyl.

$R_6$ can be alkyl having 1 to 23 C atoms. Examples can be found in the above list, supplemented by further examples, such as eicosyl, henicosyl or docosyl.

$C_1$- to $C_4$alkyl, for example methyl, ethyl, propyl, isopropyl, n-butyl, isobutyl, 2-butyl and t-butyl, is mentioned generally for $R_4$ and preferably for $R_1$ and $R_2$. Methyl and t-butyl are especially preferred here.

Alkyl radicals having 4 to 18 C atoms are preferred and alkyl radicals having 12 to 18 C atoms are especially preferred for $R_6$, the lauryl and stearyl radical being of particular interest.

Preferred examples of alkyl radicals $R_7$ are those having 1 to 4 C atoms, such as have been mentioned above for $R_1$ and $R_2$, the especially preferred examples being methyl and n-propyl.

A cycloalkyl group $R_1$, $R_2$ or $R_6$ having 5 to 12 C atoms can be, for example, cyclopentyl, cyclohexyl, cyclooctyl or cyclododecyl. Examples of $C_1$-$C_4$alkyl-substituted cycloalkyl groups having 5 to 12 ring C atoms are 2- or 4-methylcyclohexyl, dimethylcyclohexyl, trimethylcyclohexyl and t-butylcyclohexyl.

Examples of aralkyl $R_1$ or $R_2$ having 7 to 9 C atoms are benzyl and methylbenzyl.

$R_7$ can be $C_1$-$C_{18}$alkyl-substituted phenyl, for example methylphenyl, dimethylphenyl, trimethylphenyl, ethylphenyl, isopropylphenyl, t-butylphenyl, di-t-butylphenyl or 2,6-di-t-butyl-4-methylphenyl.

An alkylene radical A having 1 to 20 C atoms can be straight-chained or branched; examples are methylene, ethylene, propylene, trimethylene, 2,2-dimethyl-1,3-propanediyl, tetramethylene, pentamethylene, hexamethylene, heptamethylene, octamethylene, decamethylene or dodecamethylene, methylene being preferred.

If n is 1 or n is 2 when A is $(C_xH_{2x})CO$—X—$[(C_aH_{2a})X]_bCO$—$(C_xH_{2x})$—, $R_1$ and $R_2$ are preferably independently of one another $C_1$-$C_4$alkyl, at least one of the two in particular being t-butyl. $R_3$ is preferably —H and X is oxygen. $R_6$ is $C_8$-$C_{18}$alkyl in particular. If A is —S—, —O—, —$CH_2$—S—$CH_2$—, —$CH_2N(R_7)CH_2$— or alkylene (which preferably contains 1-12 C atoms), $R_4$ and $R_5$ are different and are —H or —OH and $R_1$, $R_2$ and $R_3$ independently of one another are $C_1$-$C_4$alkyl or —H, $R_2$ preferably being $C_1$-$C_4$alkyl, in particular t-butyl.

The antioxidants (A) described can be employed as an individual compound or as mixtures with one another.

In compounds (B) of the formula II, $R_a$ is alkyl having 8 to 18 C atoms.

Examples of such alkyl groups are n-octyl; 2-ethylhexyl and n-nonyl; 1,1,3,3-tetramethylpentyl. 3,5,5-trimethylhexyl, decyl, undecyl, dodecyl (lauryl), tridecyl, tetradecyl, pentadecyl, hexadecyl, heptadecyl and octadecyl (stearyl).

Advantageous compounds are those of the formula II in which $R_a$ is alkyl having 12 to 18 C atoms, and $R_a$ is preferably an alkyl radical having 12, 13 or 18 C atoms.

Particularly preferred compounds are those of the formula II in which $R_a$ is a lauryl or stearyl radical, a lauryl radical being especially preferred.

The antioxidants (B) mentioned can be employed as an individual compound or as mixtures with one another.

In the compounds (C) of the formula III, alkyl-substituted phenyl groups preferably contain 1 to 3, in particular 1 or 2, alkyl groups. The total number of C atoms in the alkyl substituents is preferably 1 to 18, in particular 4 to 18. Compounds which are to be mentioned in particular are those of the formula III in which $X_1$, $X_2$ and $X_3$ are $C_8$-$C_{18}$alkyl, phenyl or phenyl which is substituted by 1 or 2 $C_1$-$C_{12}$alkyl groups (in particular $C_4$-$C_{10}$alkyl groups), the alkylphenyl groups mentioned being preferred. $X_1$, $X_2$ and $X_3$ are particularly advantageously identical. $X_1$, $X_2$ and $X_3$ are particularly preferably phenyl substituted by a $C_4$-$C_{12}$alkyl group, especially octyl- or nonylphenyl and especially o- or p-nonylphenyl.

$C_6$-$C_{18}$alkyl $X_1$, $X_2$ and $X_3$ is, for example n-hexyl, n-octyl, n-nonyl, decyl, dodecyl, tetradecyl, hexadecyl or octadecyl. Alkyl groups having 8 to 18 C atoms are preferred.

Suitable phosphites of the formula III are trioctyl, tridecyl, tridodecyl, tritetradecyl, tristearyl-, trioleyl-, triphenyl-, tricresyl-, tris-p-nonylphenyl and tricyclohexyl phosphite, as well as aryl dialkyl and alkyl diaryl phosphites, for example phenyl didecyl phosphite, (2,4-di-tert.butylphenyl) di-dodecyl phosphite and (2,6-di-tert.butylphenyl) di-dodecyl phosphite. Tris-nonylphenyl phosphite is preferred. The nonyl group can be, for example, in the o- or p-position, or the groups can be isomer mixtures. The compounds (C) of the formula III are usually also called "processing stabilizers" instead of "antioxidants".

The mixing ratio of antioxidants (A) to antioxidants (B) and/or (C) can be, for example, 3:1 to 1:5, and a ratio of 2:1 to 1:3 is advantageous, the ratios being expressed as parts by weight.

If the emulsions according to the invention contain compounds (A), (B) and C, their mixing ratio is, for example, 2:1 to 3:1 to 3, in particular 1:1 to 2:1 to 2, for example 1:2:2.

The emulsion furthermore contains a surfactant of the formula R—COOY, which is preferably formed in situ from the carboxylic acid R—COOH and a compound of the alkali metal Y, preferably its hydroxide, carbonate or bicarbonate, during preparation of the emulsion.

Examples of surfactants are those in which R is $C_3$-$C_{18}$alkyl. Such surfactants are, for example, the alkali metal salts of butyric acid (butanoic acid), isobutyric acid (2-methylpropanoic acid), valeric acid (pentanoic acid), isovaleric acid (3-methylbutanoic acid), pivalic acid (2,2-dimethylpropanoic acid), lauric acid (dodecanoic acid), myristic acid (tetradecanoic acid), palmitic acid (hexadecanoic acid) and stearic acid (octadecanoic acid).

Preferred salts are those of acids having 8 to 18, in particular 12 to 18, C atoms, such as lauric acid, myristic acid, palmitic acid and stearic acid. Particularly preferred salts are those of lauric acid and stearic acid.

The abovementioned acids can also be substituted, advantageously terminally, by a phenyl group.

If R is alkenyl having 3 to 18 C atoms, which can be straight-chain or branched, acids which may be mentioned are, for example, methacrylic acid (2-methylpropenoic acid), crotonic acid (trans-2-butenoic acid), isocrotonic acid (cis-2-butenoic acid), oleic acid (cis-9-octadecenoic acid), elaidic acid (trans-9-octadecenoic acid), sorbic acid (trans,trans-2,4-hexadienoic acid), linoleic acid (cis,cis-9,12-octadecadienoic acid) or linoleic acid (cis,cis,cis-9-12,15-octadecatrienoic acid).

Mixtures of the acids mentioned amongst themselves or commercially available acid mixtures, such as are known, for example, as tall oil, are also suitable.

In compounds of an alkali metal, in particular in an alkali metal hydroxide, alkali metal bicarbonate and alkali metal carbonate (symbol Y), the alkali metal can be Li, Na, K, Rb or Cs. Mixtures of alkali metal hydroxides, alkali metal carbonates and alkali metal bicarbonates are possible. Alkali metal hydroxides and alkali metal carbonates are advantageous, alkali metal hydroxides are preferred and potassium hydroxide is particularly preferred.

The surfactant has the general formula R—COOY, in which R is advantageously $C_7$-$C_{17}$-, in particular $C_{11}$-$C_{17}$alkyl, and Y is Na or K.

The emulsion according to the invention also contains an alcohol or a mixture of alcohols of the formula R'—OH, which performs the function of a co-surfactant. The term R' is, for example, a straight-chain or branched alkyl group having 4 to 19 C atoms, and preferably a straight-chain alkyl group having 4 to 19 atoms. Examples of alcohols are those in which R' is n-butyl, isobutyl, 2-butyl, pentyl, isopentyl, hexyl, heptyl, 3-heptyl, octyl, 2-ethylhexyl, nonyl, decyl, undecyl, dodecyl, tridecyl, tetradecyl, pentadecyl, hexadecyl, heptadecyl or octadecyl, and if appropriate 2-ethylbutyl, 1-methylpentyl or 1,3-dimethylbutyl; 1,1,3,3-tetramethylbutyl; 1-methylhexyl; isoheptyl; 1-methylheptyl; 1,1,3-trimethylhexyl or 1-methylundecyl. R' is preferably a $C_8$-$C_{18}$-, in particular $C_{12}$-$C_{18}$alkyl radical, and R'—OH in particular is a lauryl or stearyl alcohol.

Alkenyl R' having 4 to 18 C atoms, which can be straight-chain or branched, is, for example, the 2-methylpropene, trans-2-butene, cis-9-octadecene, trans-9-octadecene, trans,trans-2,4-hexadiene, cis,cis-9,12-octadecadiene- or cis,cis,cis-9,12,15-octadecatriene radical.

Other examples of alcohols of the formula R'—OH are: 1-dodecanol; 1-tridecanol; 1-tetradecanol; 1-pentadecanol; 1-hexadecanol; 1-heptadecanol; 1-octadecanol; 2-methyl-1-undecanol; 2-propyl-1-nonanol; 2-butyl-1-octanol; 2-methyl-1-tridecanol; 2-ethyl-1-dodecanol; 2-propyl-1-undecanol; 2-butyl-1-decanol; 2-pentyl-1-nonanol; 2-hexyl-1-octanol; 2-methyl-1-pentadecanol; 2-ethyl-1-tetradecanol; 2-propyl-1-tridecanol; 2-butyl-1-dodecanol; 2-pentyl-1-undecanol; 2-hexyl-1-decanol; 2-heptyl-1-decanol; 2-hexyl-1-nonanol; 2-octyl-1-octanol; 2-methyl-1-heptadecanol; 2-ethyl-1-hexadecanol; 2-propyl-1-pentadecanol; 2-butyl-1-tetradecanol; 2-pentyl-1-tridecanol; 2-hexyl-1-dodecanol; 2-octyl-1-decanol; 2-nonyl-1-nonanol; 2-dodecanol; 3-dodecanol; 4-dodecanol; 5-dodecanol; 6-dodecanol; 2-tetradecanol; 3-tetradecanol; 4-tetradecanol; 5-tetradecanol; 6-tetradecanol; 7-tetradecanol; 2-hexadecanol; 3-hexadecanol; 4-hexadecanol; 5-hexadecanol; 6-hexadecanol; 7-hexadecanol; 8-hexadecanol; 2-octadecanol; 3-octadecanol; 4-octadecanol; 5-octadecanol; 6-octadecanol; 7-octadecanol; 8-octadecanol; 9-octadecanol; 9-octadecanol-1; 2,4,6-trimethyl-1-heptanol; 2,4,6,8-tetramethyl-1-nonanol; 3,5,5-trimethyl-1-hexanol; 3,5,5,7,7-pentamethyl-1-octanol; 3-butyl-1-nonanol; 3-butyl-1-undecanol; 3-hexyl-1-undecanol; 3-hexyl-1-tridecanol; 3-octyl-1-tridecanol; 2-methyl-2-undecanol; 3-methyl-3-undecanol; 4-methyl-4-undecanol; 2-methyl-2-tridecanol; 3-methyl-3-tridecanol; 4-methyl-3-tridecanol; 4-methyl-4-tridecanol; 3-ethyl-3-decanol; 3-ethyl-3-dodecanol; 2,4,6,8-tetramethyl-2-nonanol; 2-methyl-3-undecanol; 2-methyl-4-undecanol; 4-methyl-2-undecanol; 5-methyl-2-undecanol; 4-ethyl-2-decanol; 4-ethyl-3-decanol; 1-hexyn-3-ol and oleylalcohol.

The emulsions according to the invention are preferably brought to a slightly alkaline pH, for example to a pH of 7-9, in particular 7.5-9 and preferably 8-9, for example 8.2-8.8. This can be effected with any desired base, for example with NaOH, KOH, Na or K carbonates or bicarbonates, ammonia or organic amines, in particular with mono-, di- or especially triethanolamine.

The emulsions according to the invention can contain further antioxidants in addition to the compounds of the series comprising (A), (B) and/or (C).

Especially preferred emulsions are those containing at least one of the compounds of the series (A) mentioned as advantageous or preferred, for example of the formula Ib as described above, and in particular triethylene glycol bis-3-(3-tert.butyl-4-hydroxy-5-methylphenyl)propionate, at least one of the compounds of the series (B) mentioned as advantageous or preferred of the formula II, as described above, $R_a$ particularly preferably being a lauryl or stearyl radical, and/or at least one phosphite of the abovementioned series, tris-(nonylphenyl) phosphite being particularly preferred.

The process described above for the preparation of the emulsion according to the invention is preferably carried out by heating and mixing together the mixture of antioxidants containing compounds (A) and (B) from the above description, the acid RCOOH and the alcohol or, if the substances are solid at room temperature, by melting the components together and mixing them with one another by increasing the temperature. If necessary, the melt or mixture is cooled to below 100° C. and, for example, an aqueous solution of an alkali metal compound from the series comprising alkali metal hydroxides, alkali metal bicarbonates and alkali metal carbonates is then added, the concentration of the alkali metal compound being, for example, 1 to 50% by weight and preferably 3-50% by weight. Typical procedures are such that, for example, 1 to 10% by weight of the water is first added to the melt and the alkali metal compound is then added in an approximately 50% by weight solution, or the alkali metal compound is first added to the melt in an approximately 50% by weight solution and 1 to 10% by weight of the water is then added, or the alkali metal compound, dissolved in 5 to 15% by weight of the water, is added. During the addition of the solution of the alkali metal compound, the temperature is kept, for example, at 60°–100° C., which is why the solution of the alkali metal compound is also added in the heated state to the melt or mixture. The mixture is advantageously stirred for complete and homogeneous mixing of the individual components. Stirred vessels and stirring devices which are known per se and which can advantageously be heated can be used for this. Anchor stirrers, for example, are advantageous. The amount of alkali metal compound depends on the amount of acid and can be calculated in a simple manner in that advantageously approximately one equivalent of alkali metal compound is used per equivalent of acid. Deviations from the stoichimetric requirement by about ±5% do not influence the emulsifying action. The temperature which must be maintained is usually between 60° C. and 100° C., preferably between 70° C. and 90° C. Depending on the procedure chosen, as described above, the aqueous solution of the alkali metal compound and if appropriate a proportion of the water are allowed to run in slowly. A water-in-oil emulsion is as a rule formed. The emulsion advantageously has a highly viscous to pasty form. High shearing forces are generated by the stirring, and these in turn lead to very finely dispersed emulsions. In this process stage it may be appropriate to reduce the stirring intensity and to allow the temperature to fall towards room temperature. Any other antioxidants can also be metered in at this point. Further water is added to this emulsion until the desired antioxidant concentration is reached, this emulsion being inverted into the required oil-in-water emulsion. As mentioned above, the mixture should be stirred throughout the entire emulsifying process, it being completely adequate to stir the mixture slowly with a simple stirrer and with only a gentle mechanical force, in order to mix the phases thoroughly. This process has the advantage that, inter alia, no foaming occurs. Any foam which nevertheless occurs can be reduced, for example, with citric acid (concentration of 5% by weight in water). The alkali metal compound can be the alkali metal hydroxides, alkali metal bicarbonates and alkali metal carbonates mentioned, alkali metal hydroxides being preferred and calcium hydroxide being particularly preferred.

The process according to the invention has the advantage of leading to stable antioxidant emulsions. Thus, for example, dilauryl thiodipropionate tends to coagulate in attempts at emulsification, especially as a mixture with phenolic antioxidants, and severe crystallization and flocculation of amorphous particles occurs.

These disadvantages are overcome and readily flowing stable emulsions are formed according to the present invention.

After cooling, an oil-in-water emulsion having an average droplet size of as a rule about 1–10 $\mu$m diameter is obtained.

The emulsion contains 10 to 40% by weight, advantageously 20 to 30% by weight, of antioxidants (A), (B) and/or (C), and 0.5 to 20% by weight of the mixture of surfactant of the formula R—COOY and of the alcohol of the formula R'—OH. The weight ratio of surfactant R—COOY to alcohol is advantageously between 2:1 and 1:4. The ratio of acid R—COOH to alcohol R'—OH is preferably at least 1:1, for example between 1:1 and 1:4, in particular 1:1 to 1:3, for example 1:1 to 1:2.

The total water content in the emulsion can be from 40 to just about 89.5% by weight. A water content of 60 to 75% by weight is advantageous. It lies within the skills of the expert to calculate the amount of water required for the abovementioned solution of the alkali metal salt and to substract this from the total amount of water for preparation of the solution of the alkali metal compound. The remaining water then represents the remainder to 100% by weight of the emulsion and is finally added in the preparation process for the emulsion, as described above. Such an emulsion can be further processed directly or can be a concentrate which can be further diluted according to its intended use.

Particularly preferred emulsions according to the invention are those containing
a) 20 to 30% by weight of antioxidants,
b) 0.8–3.5% by weight of a surfactant of the formula R—COOY, in which R and Y are as defined above,
c) 0.8–7% by weight of an alcohol of the formula R'OH, in which R' has the abovementioned meaning, and
d) 59.5–78.4% by weight of water.

The present invention also includes the use of the emulsions according to the invention and/or prepared according to the invention for stabilizing polymers and copolymers, preferably emulsion-polymerized polymers and copolymers. The emulsions according to the invention can be used in the preparation processes of the polymers and copolymers listed below, inasmuch as these preparation processes are emulsion polymerization or copolymerization processes which require an antioxidant which can be emulsified in water or during implementation of which an antioxidant can be added.

Examples which may be listed are:

1. Polymers of mono- and diolefins, for example polypropylene, polyisobutylene, polybut-1-ene, polymethylpent-1-ene, polyisoprene or polybutadiene, as well as polymers of cycloolefins, for example, of cyclopentene or norbornene; and furthermore polyethylene (which can be non-crosslinked or crosslinked), for example high density polyethylene (HDPE), low density polyethylene (LDPE) and linear low density polyethylene (LLDPE).

2. Mixtures of the polymers mentioned under 1), for example mixtures of polypropylene with polyisobutylene and polypropylene with polyethylene (for example PP/HDPE and PP/LDPE), and mixtures of various types of polyethylene (for example LDPE/HDPE).

3. Copolymers of mono- and diolefins with one another or with other vinylmonomers, such as, for example, ethylene-propylene copolymers, linear low density polyethylene (LLDPE) and mixtures thereof with low density polyethylene (LDPE), propylenebut-1-ene copolymers, propylene-isobutylene copolymers, ethylene-but-1-ene copolymers, ethylenehexene-copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers or ethylene-acrylic acid copolymers and salts thereof (ionomers), as well as terpolymers of ethylene with propylene and a diene, such as hexadiene, dicyclopentadiene or ethylidenenorbornene; and furthermore mixtures of such copolymers with one another and with polymers mentioned under 1), for example polypropylene/ethylene-propylene copolymers, LDPE/ethylene-vinyl acetate copolymers, LDPE/ethylene-acrylic acid copolymers, LLDPE/ethylene-vinyl acetate copolymers and LLDPE/ethylene-acrylic acid copolymers.

3a. Hydrocarbon resins (for example $C_5$–$C_9$), including hydrogenated modifications thereof (for example tackifying resins).

4. Polystyrene, poly-(p-methylstyrene) and poly-(α-methylstyrene).

5. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-maleic anhydride and styrene-acrylonitrilemethyl acrylate; high impact strength mixtures of styrene copolymers and another polymer, for example a polyacrylate, a diene polymer or an ethylene-propylene-diene terpolymer; and block copolymers of styrene, for example styrene-butadiene-styrene, styrene-isoprenestyrene, styrene-ethylene/butylene-styrene or styrene-ethylene/propylene-styrene.

6. Graft copolymers of styrene or α-methylstyrene, for example styrene on polybutadiene, styrene on polybutadiene-styrene or polybutadiene-acrylonitrile copolymers, and styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof with the copolymers mentioned under 5), such as are known, for example, as the so-called ABS, MBS, ASA or AES polymers.

7. Halogen-containing polymers, for example polychloroprene, chlorinated rubber, chlorinated or chlorosulfonated polyethylene, copolymers of ethylene and chlorinated ethylene, and epichlorohydrin homo- and copolymers, in particular polymers of halogen-containing vinyl compounds, for example polyvinyl chloride, polyvinylidene chloride, polyvinyl fluoride and polyvinylidene fluoride; and copolymers thereof, such as vinyl chloride-vinylidene chloride, vinyl chloride-vinyl acetate or vinylidene chloride-vinyl acetate.

8. Polymers which are derived from α,β-unsaturated acids and derivatives thereof, such as polyacrylates and polymethacrylates, polyacrylamides and polyacrylonitriles.

9. Copolymers of the monomers mentioned under 8) with one another or with other unsaturated monomers, for example acrylonitrile-butadiene copolymers, acrylonitrilealkyl acrylate copolymers, acrylonitrile-alkoxyalkyl acrylate copolymers, acrylonitrile-vinyl halide copolymers or acrylonitrile-alkyl methacrylate-butadiene terpolymers.

10. Polymers which are derived from unsaturated alkyls and amines or their acyl derivatives or acetals, such as polyvinyl alcohol, polyvinyl acetate, stearate, benzoate or maleate, polyvinylbutyral, polyallyl phthalate and polyallylmelamine; and copolymers thereof with olefins mentioned under point 1.

11. Homo- and copolymers of cyclic ethers, such as polyalkylene glycols, polyethylene oxide, polypropylene oxide or copolymers thereof with bisglycidyl ethers.

12. Polyacetals, such as polyoxymethylene, as well as those polyoxymethylenes which contain comonomers, for example ethylene oxide; polyacetals which are modified with thermoplastic polyurethanes, acrylates or MBS.

13. Polyphenylene oxides and sulfides and mixtures thereof with styrene polymers or polyamides.

14. Polyurethanes which are derived from polyethers, polyesters and polybutadienes having terminal hydroxyl groups on the one hand and aliphatic or aromatic polyisocyanates on the other hand, as well as precursors thereof.

15. Polyamides and copolyamides which are derived from diamines and dicarboxylic acids and/or from aminocarboxylic acids or the corresponding lactams, such as polyamide 4, polyamide 6, polyamide 6/6, 6/10, 6/9, 6/12 or 4/6, polyamide 11, polyamide 12 or aromatic polyamides based on m-xylene, diamine and adipic acid; polyamides prepared from hexamethylenediamine and iso-and/or terphthalic acid and if appropriate an elastomer as a modifier, for example poly-2,4,4-trimethylhexamethylene terephthalamide and poly-m-phenylene isophthalamide. Block copolymers of the abovementioned polyamides with polyolefins, olefin-copolymers, ionomers or chemically bonded or grafted elastomers; or with polyethers, such as, for example, with polyethylene glycol, polypropylene glycol or polytetramethylene glycol. And furthermore polyamides or copolyamides modified with EPDM or ABS; and polyamides which are condensed during processing ("RIM polyamide systems").

16. Polyureas, polyimides, polyamide-imides and polybenzimidazoles.

17. Polyesters which are derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate and polyhydroxybenzoates, and block polyether-esters which are derived from polyethers having hydroxyl end groups; and furthermore polyesters modified with polycarbonates or MBS.

18. Polycarbonates and polyester carbonates.

19. Polysulfones, polyether sulfones and polyether ketones.

20. Crosslinked polymers which are derived from aldehydes on the one hand and phenols, urea or melamine on the other hand, such as phenol-formaldehyde, urea-formaldehyde and melamine-formaldehyde resins.

21. Drying and non-drying alkyd resins.

22. Unsaturated polyester resins which are derived from copolyesters of saturated and unsaturated dicarboxylic acids with polyhydric alcohols, as well as vinyl compounds as crosslinking agents, and also their halogen-containing modifications of low combustibility.

23. Crosslinkable acrylic resins which are derived from substituted acrylic acid esters, such as, for example, from epoxy acrylates, urethane acrylates or polyester acrylates.

24. Alkyd resins, polyester resins and acrylate resins which are crosslinked with melamine resins, urea resins, polyisocyanates or epoxy resins.

25. Crosslinked epoxy resins which are derived from polyepoxides, for example from bisglycidyl ethers or cycloaliphatic diepoxides.

26. Naturally occurring polymers, such as cellulose, natural rubber, gelatine and derivatives thereof which are chemically modified homologously to polymers, such as cellulose acetates, propionates and butyrates, or the cellulose ethers, such as methyl cellulose; as well as colophony resins and derivatives.

27. Mixtures (polyblends) of the abovementioned polymers, such as, for example, PP/EPDM, polyamide-/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/MBS, POM/acrylate, PPO/HIPS, PPO/PA 6.6 and copolymers, PA/HDPE, PA/PP and PA/PPO.

28. Naturally occurring and synthetic organic substances which are the pure monomeric compounds or mixtures of these, for example mineral oils, animal or vegetable fats, oils and waxes or oils, waxes and fats based on synthetic esters (for example phthalates, adipates, phosphates or trimellitates), as well as mixtures of synthetic esters with mineral oils in any weight ratios, such as are used, for example, as spinning preparations, and aqueous emulsions thereof.

29. Aqueous emulsions of naturally occurring or synthetic rubbers, for example natural rubber latex or latices of carboxylated styrene-butadiene copolymers.

The emulsions according to the invention are preferably used for stabilizing emulsion-polymerized polymers and copolymers, such as ABS, MBS and SB and SBR latices, stabilization of emulsion-polymerized polymers of ABS being particularly preferred.

As a rule, the amount of emulsion according to the invention is chosen so that the antioxidant is present in the end product, the polymer or the copolymer in amounts of 0.001 to 10% by weight, advantageously 0.01 to 5% by weight and preferably 0.1 to 3% by weight.

The emulsions according to the invention are added to the emulsion polymerization reactions in amounts which are customary per se. For example, the ratio can be chosen so that 0.01 to 10% by weight, preferably 0.01 to 5% by weight and particularly preferably 0.5 to 2.5% by weight of antioxidant is present in the system, based on the emulsion polymerization system.

The emulsions according to the invention can be added to the polymerization system and in particular to the emulsion polymerization system before the reaction, at the start or in an advanced stage of the polymerization, but as a rule before coagulation of the polymer which forms. It is furthermore possible for the emulsions according to the invention to be added to a polymer latex and for the composition to be kept in a water-dispersed form until the latex is converted into its final form, for example as a film, fiber or coating.

The following examples illustrate the invention in more detail. All the data in percentages and parts relate to the weight, unless stated otherwise.

EXAMPLE 1

100 g of a mixture of 33.3 g of triethylene glycol bis-3-(3-tert.butyl-4-hydroxy-5-methylphenyl)propionate and 66.7 g of the dilauryl ester of $\beta,\beta'$-thiodipropionic acid are melted together with 5.0 g of stearic acid and 5.0 g of stearyl alcohol at 95° C. The melt is cooled to 80°–82° C. while stirring with an anchor stirrer at 175–200 revolutions per minute, 0.98 g of KOH is added as a 50% solution (1.23 ml), and 13 ml of deionized water are added dropwise in the course of about 5 minutes. During this procedure, after 5–15 minutes with constant stirring, a creamy, highly viscous but still readily stirrable paste is formed. 375 ml of cold deionized water are then added to the viscous phase at a reduced stirring speed (125–150 revolutions per minute) in the course of about ¼ hour. The temperature is allowed to fall. A relatively mobile emulsion with little foam results. The emulsion is allowed to cool to 20°–25° C. with reduced stirring. The resulting creamy emulsion of the oil-in-water type and with good flow properties has a droplet size distribution of between 1 and 10 $\mu$m and a pH of 8.5. It is stable at room temperature.

EXAMPLE 2

25 g of triethylene glycol bis-3-(3-tert.butyl-4-hydroxy-5-methylphenyl)propionate and 75 g of the dilauryl ester of $\beta,\beta$-thiodipropionic acid are melted together with 5.0 g of stearic acid and 5.0 g of stearyl alcohol at 95° C. This melt is cooled to 80°–82° C., while stirring with an anchor stirrer at about 200 revolutions per minute. 25 ml of deionized water and 1.23 ml of a 50% KOH solution (0.98 g of KOH) are then added. After 5–15 minutes a creamy, highly viscous but still readily stirrable paste forms. The subsequent procedure is as in Example 1.

EXAMPLE 3

33.3 g of triethylene glycol bis-3-(3-tert.butyl-4-hydroxy-5-methylphenyl)propionate and 66.7 g of the dilauryl ester of $\beta,\beta$-thiodipropionic acid, 7.5 g of stearic acid and 7.5 g of stearyl alcohol are initially introduced into a stirred vessel equipped with an anchor stirrer and are fused together at 95° C. After cooling to about 85° C., 2.94 g of aqueous potassium hydroxide solution (50% by weight) are added to this melt, while stirring, 16 ml of deionized water are then added dropwise at 85° C. in the course of about 5 minutes. After 5 to 15 minutes a viscous, readily stirrable paste forms, into which 66.7 g of trisnonylphenyl phosphite are metered at 85° C. at a reduced stirrer speed in the course of 5 to 15 minutes. 633 g of deionized water are allowed to run at room temperature into the resulting mobile emulsion in the course of about 15 minutes. The internal temperature in the flask is allowed to fall at the same time. At the end of the addition of water this is about 45° C. The mixture is cooled to room temperature, with gentle stirring, during which a mobile oil-in-water emulsion having an antioxidant content of 20% and a pH of about 7 and with a droplet size of 1 to 5 $\mu$m is formed.

EXAMPLE 4

Example 3 is repeated, except that instead of 66.7 g of the dilauryl ester of $\beta,\beta'$-thiodipropionic acid, the same amount of the stearyl ester of $\beta,\beta'$-thiopropionic acid is employed. A mobile oil-in-water emulsion equivalent to the emulsion described above is formed.

EXAMPLE 5

75 g of triethylene glycol bis-3-(3-tert.butyl-4-hydroxy-5-methylphenyl)propionate, 7.5 g of stearic acid and 7.5 g of stearyl alcohol are initially introduced into a 750 ml flask which has a ground glass flange and is provided with an anchor stirrer, dropping funnel, thermometer and heating bath. The mixture is heated to 90°–95° C., whereupon a clear melt forms. The melt is then stirred at 80°–82° C. using the anchor stirrer (150–155 revolutions per minute), and 2.96 g of 50%

KOH solution and, in the course of 5-10 minutes, 15 ml of deionized water are added dropwise. When the addition of water has ended, a creamy paste which is still readily stirrable forms, whilst stirring. After stirring for a further 10 minutes, 50 g of trinonylphenyl phosphite (®Irgafos TNPP) are metered in at 80°-82° C. in the course of 10 minutes and the mixture is stirred at this temperature for a further 10 minutes. After removal of the heating bath, 337 ml of water are then metered in over a period of 30 minutes. After cooling to 20°-30° C., the pH is brought to 8.5 by addition of 5 g of triethanolamine. Final volume: about 600 ml in the form of a slightly foamy oil-in-water emulsion with good flow properties. The emulsion is stable at room temperature. Precipitates which occur at most after a prolonged period of time can be emulsified again completely without problems by heating to 80°-82° C.

The drop size in the emulsion is 1-3 μm and the density is 0.85 g/ml at 25° C. The disperse system has pseudoplastic flow properties. The viscosity decreases greatly with the shearing speed and at $D=10s^{-1}$ is 1600 mPa.s (25° C.).

EXAMPLE 6

80 g of triethylene glycol bis-3-(3-tert.butyl-4-hydroxy-5-methylphenyl)propionate, 160 g of the distearyl ester of β,β'-thiodipropionic acid (distearyl thiodipropionate), 20 g of stearic acid and 20 g of stearyl alcohol are initially introduced into a glass reactor with an anchor stirrer, dropping funnel, thermometer and heating bath and are melted at 90°-95° C. 7.88 g (5.3 ml) of 50% KOH solution are added dropwise at 80°-82° C. in the course of 5-10 minutes, whilst stirring at 150-155 rpm. 41 ml of deionized water are then added in the course of 5-10 minutes, during which the temperature is kept at not less than 80° C. After the mixture has been stirred for a further 20 minutes, 160 g of trinonylphenyl phosphite are added in the course of 10 minutes. After stirring for 10 minutes, 1481 ml of deionized water are added in the course of 30 minutes, during which the temperature falls to 45° C. After the mixture has cooled to room temperature and the stirring speed has been reduced, 30 g of triethanolamine are added in order to adjust the pH to 8.5-8.8. An oil-in-water emulsion which is stable at room temperature and has good flow properties, a density of 1 g/ml (25° C.) and a viscosity of 9.5 mPa.s ($D=10s^{-1}$) at 25° C. is thus obtained. Particle size: 1-3 microns.

EXAMPLE 7

The emulsion according to Example 1 is added, at a temperature of 50° C. and whilst stirring, to an ABS latex which has been prepared by emulsion polymerization and has a dry content of 32% in an amount such that the latex contains 0.7% by weight of antioxidants (A+B).

100 g of this latex are added to 150 g of water, which contains 1.5% of $H_2SO_4$, based on the dry weight of the ABS, at 60° C., with vigorous stirring, in order to coagulate the latex. The mixture is heated to 90° C., kept at this temperature for 2 minutes and then filtered. The residue on the filter is washed out with deionized water and dried under a vacuum of 150 mm Hg at 60° C. for 6 hours. To determine the protective action of the antioxidant during drying of the latex, 5 mg of the dry powder obtained from the latex are weighed into an aluminum sample holder and this is introduced into a differential thermal analysis apparatus. The sample is heated at 180° C. in air in the DTA apparatus and the time taken for decomposition to start is measured, the decomposition manifesting itself in a maximum of the exothermic reaction. This time is 125 minutes.

EXAMPLE 8

Example 7 is repeated, but instead of the emulsion according to Example 1, the emulsion according to Example 6 is added to the latex in an amount such that the latex contains 0.7% by weight of antioxidants (A+B+C). The time measured before decomposition starts is 109 minutes.

What is claimed is:

1. A storage-stable, non-sedimenting emulsion containing
a) 10 to 40% by weight, based on the emulsion, of antioxidants, at least one antioxidant from the series comprising the compounds (A) of the formula I

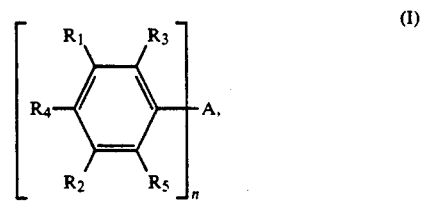

in which
$R_1$ is alkyl having 1 to 18 C atoms, cycloalkyl having 5 to 12 C atoms, $C_1$-$C_4$alkyl-substituted cycloalkyl having 5 to 12 ring C atoms, phenyl or aralkyl having 7 to 9 C atoms, or, if $R_4$ is —H or $C_1$-$C_4$alkyl and $R_5$ is —OH, $R_1$ can additionally be —H,
$R_2$ is —H, alkyl having 1 to 18 C atoms, cycloalkyl having 5 to 12 C atoms, $C_1$-$C_4$alkyl-substituted cycloalkyl having 5 to 12 ring C atoms, phenyl or aralkyl having 7 to 9 C atoms, $R_3$ is —H or $CH_3$ and
n is 1 or 2, and,
(i) when n is 1,
A is

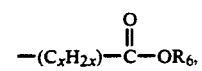

x is 0 to 6,
$R_6$ is —H, alkyl having 1 to 23 C atoms, cycloalkyl having 5 to 12 C atoms or $C_1$-$C_4$alkyl-substituted cycloalkyl having 5 to 12 ring C atoms,
$R_4$ is —OH and $R_5$ is —H, and
(ii) when n is 2,
A is the formula

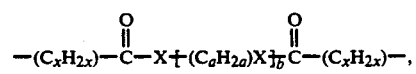

x is 0 to 6,
X is oxygen or sulfur,
a is 2 to 6,
b is 3 to 40,
$R_4$ is —OH and $R_5$ is —H, or
(iii) when n is 2,
A is —S—, —O—, —$CH_2$—S—$CH_2$—,

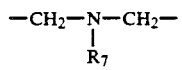

or an alkylene radical having 1 to 20 C atoms, and $R_4$ is —OH and $R_5$ is —H, or $R_5$ is —OH and $R_4$ is —H or $C_1$-$C_4$alkyl, and $R_1$ is additionally —H, and $R_7$ is alkyl having 1 to 18 C atoms, unsubstituted, hydroxy-substituted or $C_1$-$C_{18}$alkyl-substituted phenyl or a phenyl-or hydroxyphenyl-substituted $C_1$-$C_{18}$alkyl; and at least one antioxidant from the series comprising compounds (B) of the formula II

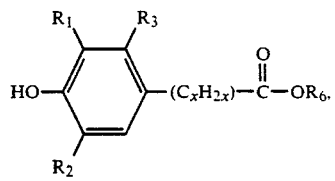

in which $R_1$, $R_2$, $R_3$ and $R_6$ are as defined in claim 1 and x is the number 2 or 3.

3. An emulsion according to claim 1, containing as the antioxidant (A) a compound of the formula Ib

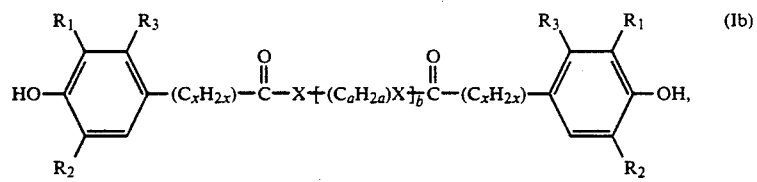

and/or of the compounds (C) of the formula II

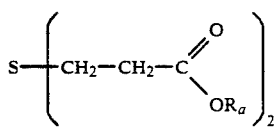

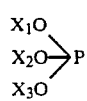

in which $R_a$ is alkyl having 8 to 18 C atoms and $X_1$, $X_2$ and $X_3$ are identical or different and are $C_6$-$C_{18}$alkyl, $C_6$-$C_{18}$alkenyl, $C_5$-$C_7$cycloalkyl, phenyl or with $C_1$-$C_{18}$alkyl substituted phenyl, b) 0.25 to 10% by weight, based on the emulsion, of a surfactant of the formula R—COOY, in which R is alkyl having 3 to 18 C atoms, alkenyl having 3 to 18 C atoms or phenyl-$C_3$-$C_{18}$alkyl and Y is an alkali metal, c) 0.25 to 10% by weight, based on the emulsion, of an alcohol of the formula R'—OH, in which R' is alkyl having 4 to 19 C atoms, alkenyl having 4 to 19 C atoms or phenyl-$C_4$-$C_{19}$-alkyl, and d) water as the remainder to make up to 100% by weight.

2. An emulsion according to claim 1, containing as the antioxidant (A) a compound of the formula Ia in which X, $R_1$, $R_2$ and $R_3$ are as defined in claim 1,
x is 2 or 3,
a is 2 to 4 and
b is 3 to 28.

4. An emulsion according to claim 3, containing a compound of the formula Ib, in which $R_1$ is methyl or tert.butyl, $R_2$ is tert.butyl and $R_3$ is H—.

5. An emulsion according to claim 3, containing a compound of the formula Ib in which X is oxygen.

6. An emulsion according to claim 3, containing a compound of the formula Ib in which the group —$(C_xH_{2x})$— is $CH_2$—$CH_2$— or

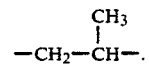

7. An emulsion according to claim 3, containing a compound of the formula Ib in which a is 2 and b is 3.

8. An emulsion according to claim 3, containing a compound of the formula

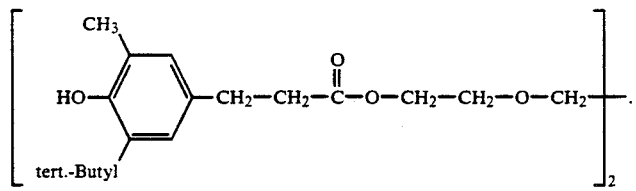

9. An emulsion according to claim 1, containing as the antioxidant (A) a compound of the formula Ic

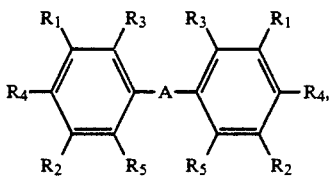

in which $R_1$, $R_2$, $R_3$, $R_4$ and $R_5$ are as defined in claim 1 and A is —S—, —$CH_2$—S—$CH_2$—, —$CH_2$—,

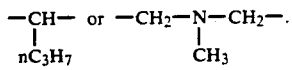

10. An emulsion according to claim 1, which contains as antioxidant compounds of the formulae I and II.

11. An emulsion according to claim 1, containing as the antioxidant (C) a compound of the formula III in which $X_1$, $X_2$ and $X_3$ are $C_8$–$C_{18}$alkyl, phenyl or phenyl which is substituted by 1 or 2 $C_1$–$C_{12}$alkyl groups.

12. An emulsion according to claim 1, containing a compound of the formula I and a compound of the formula II and/or III in a weight ratio of 3:1 to 1:5.

13. An emulsion according to claim 1, containing a surfactant of the formula R—COOY, in which R is alkyl having 7 to 17 C atoms and Y is Na or K.

14. An emulsion according to claim 1, in which the surfactant R—COOY is formed in situ, that is to say in the emulsion of an acid of the formula R—COOH and an alkali metal hydroxide, carbonate or bicarbonate.

15. An emulsion according to claim 1, containing an alcohol of the formula R'—OH, in which R' is an alkyl group having 8 to 18 C atoms.

16. An emulsion as claimed in claim 1, in which the weight ratio of acid R—COOH:alcohol R—OH is 1:1 to 1:4.

17. A process for the preparation of a storage-stable, non-sedimenting emulsion containing antioxidants (A), (B) and/or (C) and water according to claim 1, which comprises heating and mixing the antioxidants with a surfactant of the formula R—COOY, an alcohol of the formula R'—OH and water and if appropriate adding further water to establish the desired concentration, the general symbols being as defined in claim 1.

18. The process according to claim 17, wherein the antioxidants are heated and mixed with an acid of the formula R—COOH and an alcohol of the formula R'—OH and an aqueous solution of at least one alkali metal hydroxide, one alkali metal bicarbonate or one alkali metal carbonate is then added to the mixture, 1–20% by weight of the water required for the preparation of the emulsion being used as the solvent for the alkali metal compound mentioned and the alkali metal compound being employed in approximately equivalent amounts, based on the acid, and the remainder of the water is then added to establish the concentration of the emulsion.

19. The process according to claim 17, wherein the antioxidants are added in liquid form or in the liquefied form obtained by heating.

20. The process according to claim 18, wherein the antioxidants are added in liquid form or in the liquefied form obtained by heating.

* * * * *